United States Patent
Hernnaes et al.

(10) Patent No.: US 6,261,437 B1
(45) Date of Patent: Jul. 17, 2001

(54) ANODE, PROCESS FOR ANODIZING, ANODIZED WIRE AND ELECTRIC DEVICE COMPRISING SUCH ANODIZED WIRE

(75) Inventors: Bo Hernnaes; Hans-Olof Kalldin, both of Vaesteras; Torbjorn Imrell, deceased, late of Vaesteras, all of (SE), by Anne-Marie Imrell heiress

(73) Assignee: Asea Brown Boveri AB, Vaesteras (SE)

(*) Notice: Subject to any disclaimer, the term of this patent is extended or adjusted under 35 U.S.C. 154(b) by 0 days.

(21) Appl. No.: 09/297,631

(22) PCT Filed: Nov. 4, 1997

(86) PCT No.: PCT/SE97/01838

§ 371 Date: Jul. 1, 1999

§ 102(e) Date: Jul. 1, 1999

(87) PCT Pub. No.: WO98/21385

PCT Pub. Date: May 22, 1998

(30) Foreign Application Priority Data

Nov. 4, 1996 (SE) .................................................... 9604035

(51) Int. Cl.[7] .................................................. C25D 11/04

(52) U.S. Cl. ........................................... 205/324; 310/42

(58) Field of Search ........................... 204/286; 205/124, 205/139, 138, 324

(56) References Cited

U.S. PATENT DOCUMENTS

| 681,800 | 9/1901 | Lasche | 310/254 |
|---|---|---|---|
| 847,008 | 3/1907 | Kitsee | 310/42 |
| 1,304,451 | 5/1919 | Burnham | 336/57 |
| 1,418,856 | 6/1922 | Williamson | 310/196 |
| 1,481,585 | 1/1924 | Beard | 336/842 |

(List continued on next page.)

FOREIGN PATENT DOCUMENTS

| 399790 | 7/1995 | (AT) . |
|---|---|---|
| 565063 | 2/1957 | (BE) . |
| 391071 | 4/1965 | (CH) . |
| 266037 | 10/1965 | (CH) . |
| 534448 | 2/1973 | (CH) . |

(List continued on next page.)

OTHER PUBLICATIONS

Shipboard Electrical Insulation; G. L. Moses, 1951, pp2&3.

ABB Elkrafthandbok; ABB AB; 1988 ; pp274–276.

Elkraft teknisk Handbok, 2 Elmaskiner; A. Alfredsson et al; 1988, pp 121–123.

High Voltage Cables in a New Class of Generators Powerformer; M. Leijon et al; Jun. 14, 1999; pp1–8.

(List continued on next page.)

*Primary Examiner*—Elvin Enad
(74) *Attorney, Agent, or Firm*—Oblon, Spivak, McClelland, Maier & Neustadt, P.C.

(57) ABSTRACT

An anode, process for anodizing, an anodized wire and electric device having an anodized wire for use in high-voltage electric machines. A predetermined length of metallic conductor wire is wound around a holder, where respective windings are separated from one another with guide cams and guide slots. The metallic conductor wire and holder are then disposed in an electrolyte, where both ends of the metallic conductor wire are connected to a positive pole on a current source so as to implement the anodization operation. An oxide layer is formed as a result of the anodizing operation on a metallic portion of the metallic conductor wire. Properties of the oxide layer are such that the electrical insulation properties and adherence of the oxide layer to the wire are suitable for use in windings of electric machines for high-voltage applications.

13 Claims, 2 Drawing Sheets

U.S. PATENT DOCUMENTS

Figure 1:
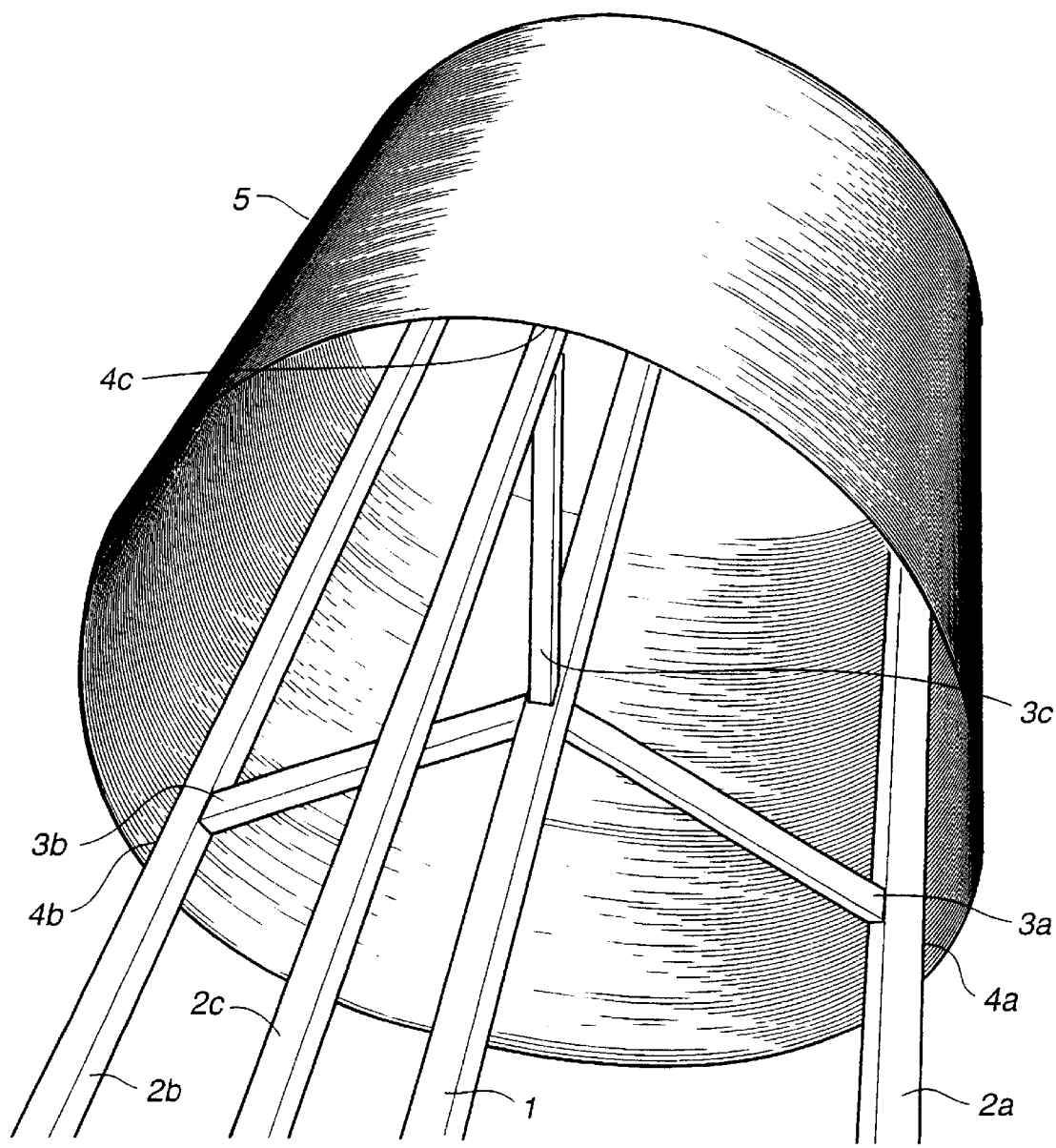

| | | | |
|---|---|---|---|
| 1,508,456 | 9/1924 | Lenz | 310/42 |
| 1,728,915 | 9/1929 | Blankenship et al. | 242/157.1 |
| 1,742,985 | 1/1930 | Burnham | 336/60 |
| 1,747,507 | 2/1930 | George | 336/60 |
| 1,756,672 | 4/1930 | Barr | 310/259 |
| 1,762,775 | 6/1930 | Ganz | 333/32 |
| 1,781,308 | 11/1930 | Vos | 174/106 R |
| 1,861,182 | 5/1932 | Hendey et al. | 310/215 |
| 1,904,885 | 4/1933 | Seeley | 310/42 |
| 1,974,406 | 9/1934 | Apple et al. | 310/195 |
| 2,006,170 | 6/1935 | Juhlin | 310/54 |
| 2,206,856 | 7/1940 | Shearer | 307/105 |
| 2,217,430 | 10/1940 | Baudry | 226/172 |
| 2,241,832 | 5/1941 | Wahlquist | 174/85 |
| 2,251,291 | 8/1941 | Reichelt | 336/60 |
| 2,256,897 | 9/1941 | Davidson et al. | 174/107 |
| 2,295,415 | 9/1942 | Monroe | 336/60 |
| 2,409,893 | 10/1946 | Pendleton et al. | 310/42 |
| 2,415,652 | 2/1947 | Norton | 174/107 |
| 2,424,443 | 7/1947 | Evans | 310/259 |
| 2,436,306 | 2/1948 | Johnson | 174/73.1 |
| 2,446,999 | 8/1948 | Camilli | 336/178 |
| 2,459,322 | 1/1949 | Johnston | 336/57 |
| 2,462,651 | 2/1949 | Lord | 336/183 |
| 2,498,238 | 2/1950 | Berberich et al. | 174/120 SC |
| 2,650,350 | 8/1953 | Heath | 310/42 |
| 2,721,905 | 10/1955 | Monroe | 360/291.3 |
| 2,749,456 | 6/1956 | Luenberger | 310/42 |
| 2,780,771 | 2/1957 | Lee | 323/329 |
| 2,846,599 | 8/1958 | McAdam | 310/43 |
| 2,885,581 | 5/1959 | Pileggi | 310/260 |
| 2,943,242 | 6/1960 | Schaschl et al. | 361/212 |
| 2,947,957 | 8/1960 | Spindler | 336/61 |
| 2,959,699 | 11/1960 | Smith et al. | 310/260 |
| 2,962,679 | 11/1960 | Stratton | 336/83 |
| 2,975,309 | 3/1961 | Seidner | 310/54 |
| 3,014,139 | 12/1961 | Shildneck | 310/42 |
| 3,046,214 * | 7/1962 | Ross | 204/210 |
| 3,098,893 | 7/1963 | Pringle et al. | 174/102 SC |
| 3,130,335 | 4/1964 | Rejda | 310/215 |
| 3,143,269 | 8/1964 | Eldik | 226/172 |
| 3,157,806 | 11/1964 | Wiedemann | 310/64 |
| 3,158,770 | 11/1964 | Coggeshall et al. | 310/214 |
| 3,197,723 | 7/1965 | Dortort | 310/42 |
| 3,268,766 | 8/1966 | Amos | 361/212 |
| 3,304,599 | 2/1967 | Nordin | 29/605 |
| 3,354,331 | 11/1967 | Broeker et al. | 310/196 |
| 3,365,657 | 1/1968 | Webb | 323/206 |
| 3,372,283 | 3/1968 | Jaecklin | 307/83 |
| 3,392,779 | 7/1968 | Tilbrook | 310/42 |
| 3,411,027 | 11/1968 | Rosenberg | 310/42 |
| 3,418,530 | 12/1968 | Cheever | 361/56 |
| 3,435,262 | 3/1969 | Bennett et al. | 310/54 |
| 3,437,858 | 4/1969 | White | 310/215 |
| 3,444,407 | 5/1969 | Yates | 310/215 |
| 3,447,002 | 5/1969 | Ronnevig | 310/54 |
| 3,484,690 | 12/1969 | Wald | 324/107 |
| 3,541,221 | 11/1970 | Aupoix et al. | 310/42 |
| 3,560,777 | 2/1971 | Moeller | 310/270 |
| 3,571,690 | 3/1971 | Lataisa | 310/42 |
| 3,593,123 | 7/1971 | Williamson | 324/545 |
| 3,631,519 | 12/1971 | Salahshourian | 174/73.1 |
| 3,644,662 | 2/1972 | Salahshourian | 174/73.1 |
| 3,651,244 | 3/1972 | Silver et al. | 310/42 |
| 3,651,402 | 3/1972 | Leffmann | 324/772 |
| 3,660,721 | 5/1972 | Baird | 310/42 |
| 3,666,876 | 5/1972 | Forster | 310/42 |
| 3,670,192 | 6/1972 | Andersson et al. | 310/196 |
| 3,675,056 | 7/1972 | Lenz | 310/54 |
| 3,684,821 | 8/1972 | Miyauchi et al. | 174/102 SC |
| 3,684,906 | 8/1972 | Lexz | 310/42 |
| 3,699,238 | 10/1972 | Hansen et al. | 310/42 |
| 3,716,652 | 2/1973 | Lusk et al. | 174/15.3 |
| 3,716,719 | 2/1973 | Angelery et al. | 307/17 |
| 3,727,085 | 4/1973 | Goetz et al. | 310/54 |
| 3,740,600 | 6/1973 | Turley | 310/194 |
| 3,743,867 | 7/1973 | Smith, Jr. | 310/42 |
| 3,746,954 | 7/1973 | Myles et al. | 318/247 |
| 3,758,699 | 9/1973 | Lusk et al. | 174/19 |
| 3,778,891 | 12/1973 | Amasino et al. | 29/596 |
| 3,781,739 | 12/1973 | Meyer | 336/70 |
| 3,787,607 | 1/1974 | Schlafly | 310/42 |
| 3,792,399 | 2/1974 | McLyman | 396/210 |
| 3,801,843 | 4/1974 | Corman et al. | 310/52 |
| 3,809,933 | 5/1974 | Sugawara et al. | 310/52 |
| 3,813,764 | 6/1974 | Tanaka et al. | 310/42 |
| 3,828,115 | 8/1974 | Hvizd, Jr. | 310/42 |
| 3,881,647 | 5/1975 | Wolfe | 226/172 |
| 3,884,154 | 5/1975 | Marten | 104/286 |
| 3,891,880 | 6/1975 | Britsch | 310/196 |
| 3,902,000 | 8/1975 | Forsyth et al. | 174/15.3 |
| 3,912,957 | 10/1975 | Reynolds | 310/42 |
| 3,932,779 | 1/1976 | Madsen | 310/215 |
| 3,932,791 | 1/1976 | Oswald | 361/106 |
| 3,943,392 | 3/1976 | Keuper et al. | 310/215 |
| 3,947,278 | 3/1976 | Youtsey | 106/31.68 |
| 3,965,408 | 6/1976 | Higuchi et al. | 363/75 |
| 3,968,388 | 7/1976 | Lambrecht et al. | 310/53 |
| 3,971,543 | 7/1976 | Shanahan | 254/134.3 |
| 3,974,314 | 8/1976 | Fuchs | 428/212 |
| 3,993,860 | 11/1976 | Snow et al. | 310/42 |
| 3,995,785 | 12/1976 | Arick et al. | 242/432.4 |
| 4,001,616 | 1/1977 | Lonseth et al. | 310/45 |
| 4,008,367 | 2/1977 | Sunderhauf | 310/42 |
| 4,008,409 | 2/1977 | Rhudy et al. | 310/45 |
| 4,031,310 | 6/1977 | Jachimowicz | 174/15.6 |
| 4,039,740 | 8/1977 | Iwata | 174/15.6 |
| 4,041,431 | 8/1977 | Enoksen | 336/160 |
| 4,047,138 | 9/1977 | Steigerwald | 336/100 |
| 4,064,419 | 12/1977 | Peterson | 323/201 |
| 4,084,307 | 4/1978 | Schultz et al. | 29/460 |
| 4,085,347 | 4/1978 | Lichius | 310/259 |
| 4,088,953 | 5/1978 | Sarian | 324/232 |
| 4,091,138 | 5/1978 | Takagi et al. | 428/209 |
| 4,091,139 | 5/1978 | Quirk | 412/117 |
| 4,099,227 | 7/1978 | Liptak | 363/126 |
| 4,103,075 | 7/1978 | Adam | 428/614 |
| 4,106,069 | 8/1978 | Trautner et al. | 361/30 |
| 4,107,092 | 8/1978 | Carnahan et al. | 252/511 |
| 4,109,098 | 8/1978 | Olsson et al. | 174/106 SC |
| 4,121,148 | 10/1978 | Platzer | 322/59 |
| 4,126,522 * | 11/1978 | Edlund | 205/139 |
| 4,132,914 | 1/1979 | Khutoretsky | 310/42 |
| 4,134,036 | 1/1979 | Curtiss | 310/42 |
| 4,134,055 | 1/1979 | Akamatsu | 318/696 |
| 4,134,146 | 1/1979 | Stetson | 361/130 |
| 4,149,101 | 4/1979 | Lesokhin et al. | 310/214 |
| 4,152,221 * | 5/1979 | Schaedel | 205/108 |
| 4,152,615 | 5/1979 | Calfo et al. | 310/256 |
| 4,160,193 | 7/1979 | Richmond | 315/281 |
| 4,164,672 | 8/1979 | Flick | 310/54 |
| 4,164,772 | 8/1979 | Hingorani | 361/58 |
| 4,177,397 | 12/1979 | Lill | 310/71 |
| 4,177,418 | 12/1979 | Brueckner et al. | 323/250 |
| 4,184,186 | 1/1980 | Barkan | 361/10 |
| 4,196,060 * | 4/1980 | Patrie et al. | 205/50 |
| 4,200,817 | 4/1980 | Bratoljic | 310/198 |
| 4,200,818 | 4/1980 | Ruffing et al. | 310/214 |
| 4,206,434 | 6/1980 | Hase | 336/5 |
| 4,207,427 | 6/1980 | Beretta et al. | 174/26 R |
| 4,207,482 | 6/1980 | Neumeyer et al. | 310/45 |

| | | | |
|---|---|---|---|
| 4,208,597 | 6/1980 | Mulach et al. | 310/59 |
| 4,229,721 | 10/1980 | Koloczek et al. | 336/133 |
| 4,238,339 | 12/1980 | Khutorestsky et al. | 310/260 |
| 4,239,999 | 12/1980 | Vinokurov et al. | 310/52 |
| 4,245,182 | 1/1981 | Aotsu et al. | 322/20 |
| 4,246,694 | 1/1981 | Raschbichler et al. | 29/586 |
| 4,255,684 | 3/1981 | Mischler et al. | 310/216 |
| 4,258,280 | 3/1981 | Starcevic | 310/157 |
| 4,262,209 | 4/1981 | Berner | 290/7 |
| 4,274,027 | 6/1981 | Higuchi et al. | 310/269 |
| 4,281,264 | 7/1981 | Keim et al. | 310/194 |
| 4,292,558 | 9/1981 | Flick et al. | 310/42 |
| 4,307,311 | 12/1981 | Grozinger | 310/179 |
| 4,308,476 | 12/1981 | Schuler | 310/45 |
| 4,308,575 | 12/1981 | Mase | 363/48 |
| 4,310,966 | 1/1982 | Brietenbach | 29/596 |
| 4,314,168 | 2/1982 | Breitenbach | 310/42 |
| 4,317,001 | 2/1982 | Silver et al. | 174/102 SC |
| 4,320,645 | 3/1982 | Stanley | 72/132 |
| 4,321,426 | 3/1982 | Schaeffer | 310/42 |
| 4,321,518 | 3/1982 | Akamatsu | 318/696 |
| 4,330,726 | 5/1982 | Albright et al. | 254/134.3 |
| 4,337,922 | 7/1982 | Streiff et al. | 322/95 |
| 4,341,989 | 7/1982 | Sandberg et al. | 322/95 |
| 4,347,449 | 8/1982 | Beau | 310/193 |
| 4,347,454 | 8/1982 | Gellert et al. | 310/193 |
| 4,353,612 | 10/1982 | Meyers | 290/44 |
| 4,357,542 | 11/1982 | Kirschbaum | 290/44 |
| 4,360,748 | 11/1982 | Raschbichler et al. | 310/13 |
| 4,361,723 | 11/1982 | Hvizd Jr., et al. | 310/42 |
| 4,365,178 | 12/1982 | Lexz | 310/42 |
| 4,367,425 | 1/1983 | Mendelsohn et al. | 310/260 |
| 4,367,890 | 1/1983 | Spirk | 310/42 |
| 4,368,418 | 1/1983 | Demello et al. | 323/201 |
| 4,369,389 | 1/1983 | Lambrecht | 310/214 |
| 4,371,745 | 2/1983 | Sakashita | 174/115 |
| 4,384,944 | 5/1983 | Silver et al. | 310/42 |
| 4,387,316 | 6/1983 | Katsekas | 310/214 |
| 4,401,920 | 8/1983 | Taylor et al. | 310/42 |
| 4,403,163 | 9/1983 | Rarmerding et al. | 310/213 |
| 4,404,486 | 9/1983 | Keim et al. | 310/198 |
| 4,411,710 | 10/1983 | Mochizuki et al. | 148/243 |
| 4,421,284 | 12/1983 | Pan | 242/428.1 |
| 4,425,521 | 1/1984 | Rosenberry, Jr. et al. | 310/214 |
| 4,426,771 | 1/1984 | Wang et al. | 29/596 |
| 4,429,244 | 1/1984 | Nikiten et al. | 310/254 |
| 4,431,960 | 2/1984 | Zucker | 323/340 |
| 4,432,029 | 2/1984 | Lundqvist | 310/42 |
| 4,437,464 | 3/1984 | Crow | 310/42 |
| 4,443,725 | 4/1984 | Derderian et al. | 310/214 |
| 4,470,884 * | 9/1984 | Carr | 205/139 |
| 4,473,765 | 9/1984 | Butman, Jr. et al. | 310/215 |
| 4,475,075 | 10/1984 | Munn | 322/1 |
| 4,477,690 | 10/1984 | Nikitin et al. | 174/15.6 |
| 4,481,438 | 11/1984 | Keim | 310/201 |
| 4,484,106 | 11/1984 | Taylor et al. | 310/42 |
| 4,488,079 | 12/1984 | Dailey et al. | 310/260 |
| 4,490,651 | 12/1984 | Taylor et al. | 310/42 |
| 4,503,284 | 3/1985 | Minnick et al. | 174/36 |
| 4,508,251 | 4/1985 | Harada et al. | 310/42 |
| 4,510,077 | 4/1985 | Elton | 252/502 |
| 4,517,471 | 5/1985 | Sachs | 307/67 |
| 4,520,287 | 5/1985 | Wang et al. | 310/42 |
| 4,523,249 | 6/1985 | Arimoto | 361/58 |
| 4,538,131 | 8/1985 | Baier et al. | 336/57 |
| 4,546,210 | 10/1985 | Akiba et al. | 174/114 R |
| 4,551,780 | 11/1985 | Canay | 361/113 |
| 4,557,038 | 12/1985 | Wcislo et al. | 27/596 |
| 4,560,896 | 12/1985 | Vogt et al. | 310/215 |
| 4,565,929 | 1/1986 | Baskin et al. | 290/44 |
| 4,571,453 | 2/1986 | Takaoka et al. | 310/42 |
| 4,588,916 | 5/1986 | Lis | 310/260 |
| 4,590,416 | 5/1986 | Porche et al. | 323/205 |
| 4,594,630 | 6/1986 | Rabinowitz et al. | 361/13 |
| 4,607,183 | 8/1986 | Rieber et al. | 310/214 |
| 4,615,109 | 10/1986 | Wcislo et al. | 29/732 |
| 4,615,778 | 10/1986 | Elton | 310/42 |
| 4,618,795 | 10/1986 | Cooper et al. | 310/260 |
| 4,619,040 | 10/1986 | Wang et al. | 29/596 |
| 4,622,116 | 11/1986 | Elton et al. | 310/42 |
| 4,633,109 | 12/1986 | Feigel | 310/682 |
| 4,650,924 | 3/1987 | Kauffman et al. | 174/117 F |
| 4,652,963 | 3/1987 | Fahlen | 310/42 |
| 4,656,316 | 4/1987 | Meltsch | 310/42 |
| 4,656,379 | 4/1987 | McCarty | 310/181 |
| 4,677,328 | 6/1987 | Kumakura | 310/67 R |
| 4,687,882 | 8/1987 | Stone et al. | 174/102 SC |
| 4,692,731 | 9/1987 | Osinga | 335/299 |
| 4,723,083 | 2/1988 | Elton | 310/42 |
| 4,723,104 | 2/1988 | Rohatyn | 318/813 |
| 4,724,345 | 2/1988 | Elton et al. | 310/42 |
| 4,732,412 | 3/1988 | van der Linden et al. | 310/42 |
| 4,737,704 | 4/1988 | Kalinnikov et al. | 323/328 |
| 4,745,314 | 5/1988 | Nakano | 310/57 |
| 4,761,602 | 8/1988 | Leibovich | 310/42 |
| 4,766,365 | 8/1988 | Bolduc et al. | 323/308 |
| 4,771,168 | 9/1988 | Gundersen et al. | 310/42 |
| 4,785,138 | 11/1988 | Brietenbach et al. | 174/106 SC |
| 4,795,933 | 1/1989 | Sakai | 310/269 |
| 4,827,172 | 5/1989 | Kobayashi | 310/216 |
| 4,845,308 | 7/1989 | Womack, Jr. et al. | 174/15.4 |
| 4,847,747 | 7/1989 | Abbondanti | 363/138 |
| 4,853,565 | 8/1989 | Elton et al. | 310/45 |
| 4,859,810 | 8/1989 | Cloetens et al. | 174/110 |
| 4,859,989 | 8/1989 | McPherson | 310/42 |
| 4,860,430 | 8/1989 | Raschbichler et al. | 29/596 |
| 4,864,266 | 9/1989 | Feather et al. | 336/150 |
| 4,883,230 | 11/1989 | Lindstrom | 242/474.4 |
| 4,890,040 | 12/1989 | Gundersen | 310/42 |
| 4,894,284 | 1/1990 | Yamanouchi et al. | 428/378 |
| 4,914,386 | 4/1990 | Zocholl | 324/772 |
| 4,918,347 | 4/1990 | Takaba | 310/179 |
| 4,918,835 | 4/1990 | Wcislo et al. | 29/732 |
| 4,924,342 | 5/1990 | Lee | 361/58 |
| 4,926,079 | 5/1990 | Niemela et al. | 310/71 |
| 4,942,326 | 7/1990 | Butler, III et al. | 310/260 |
| 4,949,001 | 8/1990 | Campbell | 310/220 |
| 4,982,147 | 1/1991 | Lauw | 310/42 |
| 4,994,952 | 2/1991 | Silva et al. | 363/56 |
| 4,997,995 | 3/1991 | Simmons et al. | 174/120 SC |
| 5,012,125 | 4/1991 | Conway | 307/149 |
| 5,030,813 | 7/1991 | Stanisz | 310/42 |
| 5,036,165 | 7/1991 | Elton et al. | 174/102 SC |
| 5,036,238 | 7/1991 | Tajima | 310/214 |
| 5,066,881 | 11/1991 | Elton et al. | 310/213 |
| 5,067,046 | 11/1991 | Elton et al. | 361/220 |
| 5,083,360 | 1/1992 | Valencic et al. | 29/606 |
| 5,086,246 | 2/1992 | Dymond | 310/269 |
| 5,091,609 | 2/1992 | Swada et al. | 310/42 |
| 5,094,703 | 3/1992 | Takaoka et al. | 148/269 |
| 5,095,175 | 3/1992 | Yoshida et al. | 310/42 |
| 5,097,241 | 3/1992 | Smith et al. | 336/60 |
| 5,097,591 | 3/1992 | Wcislo et al. | 29/762 |
| 5,111,095 | 5/1992 | Hendershot | 310/168 |
| 5,124,607 | 6/1992 | Rieber et al. | 310/214 |
| 5,136,459 | 8/1992 | Fararooy | 361/93.2 |
| 5,140,290 | 8/1992 | Dersch | 505/211 |
| 5,153,460 | 10/1992 | Bovino et al. | 307/108 |
| 5,168,662 | 12/1992 | Nakamura et al. | 451/46 |
| 5,171,941 | 12/1992 | Shimizu et al. | 310/42 |
| 5,182,537 | 1/1993 | Thuis | 310/42 |
| 5,187,428 | 2/1993 | Hutchison et al. | 323/250 |

| | | | |
|---|---|---|---|
| 5,231,249 | 7/1993 | Kimura et al. | 310/42 |
| 5,235,488 | 8/1993 | Koch | 361/45 |
| 5,246,783 | 9/1993 | Spenadel et al. | 428/461 |
| 5,264,778 | 11/1993 | Kimmel et al. | 322/25 |
| 5,287,262 | 2/1994 | Klein | 310/42 |
| 5,304,883 | 4/1994 | Denk | 310/180 |
| 5,305,961 | 4/1994 | Errard et al. | 242/447.1 |
| 5,321,308 | 6/1994 | Johncock | 290/40 C |
| 5,323,330 | 6/1994 | Asplund et al. | 700/292 |
| 5,325,008 | 6/1994 | Grant | 310/214 |
| 5,325,259 | 6/1994 | Paulsson | 310/42 |
| 5,327,637 | 7/1994 | Britenbach et al. | 29/596 |
| 5,341,281 | 8/1994 | Skibinski | 363/39 |
| 5,343,139 | 8/1994 | Guygyi et al. | 323/207 |
| 5,355,046 | 10/1994 | Weigelt | 310/260 |
| 5,365,132 | 11/1994 | Hann et al. | 310/58 |
| 5,387,890 | 2/1995 | Estop et al. | 335/216 |
| 5,397,513 | 3/1995 | Steketee, Jr. | 264/36.77 |
| 5,399,941 | 3/1995 | Grothaus et al. | 310/42 |
| 5,400,005 | 3/1995 | Bobry | 336/83 |
| 5,408,169 | 4/1995 | Jeanneret | 310/42 |
| 5,449,861 | 9/1995 | Fujino et al. | 310/42 |
| 5,452,170 | 9/1995 | Ohde et al. | 361/13 |
| 5,468,916 | 11/1995 | Litenas et al. | 174/127 |
| 5,499,178 | 3/1996 | Mohan | 310/42 |
| 5,500,632 | 3/1996 | Halser, III | 336/180 |
| 5,510,942 | 4/1996 | Bock et al. | 361/16 |
| 5,530,307 | 6/1996 | Horst | 310/156 |
| 5,533,658 | 7/1996 | Benedict et al. | 310/42 |
| 5,534,754 | 7/1996 | Poumey | 310/42 |
| 5,545,853 | 8/1996 | Hildreth | 174/220 R |
| 5,550,410 | 8/1996 | Titus | 290/52 |
| 5,583,387 | 12/1996 | Takeuchi et al. | 310/212 |
| 5,587,126 | 12/1996 | Steketee, Jr. | 264/568 |
| 5,598,137 | 1/1997 | Alber et al. | 336/223 |
| 5,607,320 | 3/1997 | Wright | 439/394 |
| 5,612,510 | 3/1997 | Hildreth | 174/120 SC |
| 5,663,605 | 9/1997 | Evans et al. | 310/181 |
| 5,672,926 | 9/1997 | Brandes et al. | 310/181 |
| 5,689,223 | 11/1997 | Demarmels et al. | 335/216 |
| 5,807,447 | 9/1998 | Forrest | 156/31 |
| 5,834,699 | 11/1998 | Buck et al. | 310/42 |

FOREIGN PATENT DOCUMENTS

| | | |
|---|---|---|
| 539328 | 7/1973 | (CH) . |
| 646403 | 2/1979 | (CH) . |
| 657482 | 8/1986 | (CH) . |
| 1189322 | 10/1986 | (CH) . |
| 40414 | 8/1887 | (DE) . |
| 134022 | 12/1901 | (DE) . |
| 277012 | 7/1914 | (DE) . |
| 336418 | 6/1920 | (DE) . |
| 372390 | 3/1923 | (DE) . |
| 386561 | 12/1923 | (DE) . |
| 387973 | 1/1924 | (DE) . |
| 406371 | 11/1924 | (DE) . |
| 425551 | 2/1926 | (DE) . |
| 426793 | 3/1926 | (DE) . |
| 432169 | 7/1926 | (DE) . |
| 433749 | 9/1926 | (DE) . |
| 435608 | 10/1926 | (DE) . |
| 435609 | 10/1926 | (DE) . |
| 441717 | 3/1927 | (DE) . |
| 443011 | 4/1927 | (DE) . |
| 460124 | 5/1928 | (DE) . |
| 482506 | 9/1929 | (DE) . |
| 501181 | 7/1930 | (DE) . |
| 523047 | 4/1931 | (DE) . |
| 568508 | 1/1933 | (DE) . |
| 572030 | 3/1933 | (DE) . |
| 584639 | 9/1933 | (DE) . |
| 586121 | 10/1933 | (DE) . |
| 604972 | 11/1934 | (DE) . |
| 629301 | 4/1936 | (DE) . |
| 673545 | 3/1939 | (DE) . |
| 719009 | 3/1942 | (DE) . |
| 846583 | 8/1952 | (DE) . |
| 875227 | 4/1953 | (DE) . |
| 975999 | 1/1963 | (DE) . |
| 1465719 | 5/1969 | (DE) . |
| 1807391 | 5/1970 | (DE) . |
| 2050674 | 5/1971 | (DE) . |
| 1638176 | 6/1971 | (DE) . |
| 2155371 | 5/1973 | (DE) . |
| 2400698 | 7/1975 | (DE) . |
| 2520511 | 11/1976 | (DE) . |
| 2656389 | 6/1978 | (DE) . |
| 2721905 | 11/1978 | (DE) . |
| 137164 | 8/1979 | (DE) . |
| 138840 | 11/1979 | (DE) . |
| 2824951 | 12/1979 | (DE) . |
| 2835386 | 2/1980 | (DE) . |
| 2839517 | 3/1980 | (DE) . |
| 2854520 | 6/1980 | (DE) . |
| 3009102 | 9/1980 | (DE) . |
| 2913697 | 10/1980 | (DE) . |
| 2920478 | 12/1980 | (DE) . |
| 3028777 | 3/1981 | (DE) . |
| 2939004 | 4/1981 | (DE) . |
| 3006382 | 8/1981 | (DE) . |
| 3008818 | 9/1981 | (DE) . |
| 209313 | 4/1984 | (DE) . |
| 3305225 | 8/1984 | (DE) . |
| 3309051 | 9/1984 | (DE) . |
| 3441311 | 5/1986 | (DE) . |
| 3543106 | 6/1987 | (DE) . |
| 2917717 | 8/1987 | (DE) . |
| 3612112 | 10/1987 | (DE) . |
| 3726346 | 2/1989 | (DE) . |
| 3925337 | 2/1991 | (DE) . |
| 4023903 | 11/1991 | (DE) . |
| 4022476 | 1/1992 | (DE) . |
| 4233558 | 3/1994 | (DE) . |
| 4402184 | 8/1995 | (DE) . |
| 4409794 | 8/1995 | (DE) . |
| 4412761 | 10/1995 | (DE) . |
| 4420322 | 12/1995 | (DE) . |
| 196 20 906 | 1/1996 | (DE) . |
| 4438186 | 5/1996 | (DE) . |
| 19020222 | 3/1997 | (DE) . |
| 19547229 | 6/1997 | (DE) . |
| 468827 | 7/1997 | (DE) . |
| 049104 | 4/1982 | (EP) . |
| 0493704 | 4/1982 | (EP) . |
| 0056580 A1 | 7/1982 | (EP) . |
| 078908 | 5/1983 | (EP) . |
| 0120154 | 10/1984 | (EP) . |
| 0130124 | 1/1985 | (EP) . |
| 0142813 | 5/1985 | (EP) . |
| 0155405 | 9/1985 | (EP) . |
| 0102513 | 1/1986 | (EP) . |
| 0174783 | 3/1986 | (EP) . |
| 0185788 | 7/1986 | (EP) . |
| 0277358 | 8/1986 | (EP) . |
| 0234521 | 9/1987 | (EP) . |
| 0244069 | 11/1987 | (EP) . |
| 0246377 | 11/1987 | (EP) . |
| 0265868 | 5/1988 | (EP) . |
| 0274691 | 7/1988 | (EP) . |
| 0280759 | 9/1988 | (EP) . |
| 0282876 | 9/1988 | (EP) . |
| 0309096 | 3/1989 | (EP) . |

| | | | | | | |
|---|---|---|---|---|---|---|
| 0314860 | 5/1989 | (EP) . | | 965741 | 8/1964 | (GB) . |
| 0316911 | 5/1989 | (EP) . | | 992249 | 5/1965 | (GB) . |
| 0317248 | 5/1989 | (EP) . | | 1024583 | 3/1966 | (GB) . |
| 0335430 | 10/1989 | (EP) . | | 1053337 | 12/1966 | (GB) . |
| 0342554 | 11/1989 | (EP) . | | 1059123 | 2/1967 | (GB) . |
| 0221404 | 5/1990 | (EP) . | | 1103098 | 2/1968 | (GB) . |
| 0375101 | 6/1990 | (EP) . | | 1103099 | 2/1968 | (GB) . |
| 0406437 | 1/1991 | (EP) . | | 1117401 | 6/1968 | (GB) . |
| 0439410 | 7/1991 | (EP) . | | 1135242 | 12/1968 | (GB) . |
| 0440865 | 8/1991 | (EP) . | | 1147049 | 4/1969 | (GB) . |
| 0469155 A1 | 2/1992 | (EP) . | | 1157885 | 7/1969 | (GB) . |
| 0490705 | 6/1992 | (EP) . | | 1174659 | 12/1969 | (GB) . |
| 0503817 | 9/1992 | (EP) . | | 1236082 | 6/1971 | (GB) . |
| 0571155 | 11/1993 | (EP) . | | 1268770 | 3/1972 | (GB) . |
| 0620570 | 10/1994 | (EP) . | | 1319257 | 6/1973 | (GB) . |
| 0620630 | 10/1994 | (EP) . | | 1322433 | 7/1973 | (GB) . |
| 0642027 | 3/1995 | (EP) . | | 1340983 | 12/1973 | (GB) . |
| 0671632 | 9/1995 | (EP) . | | 1341050 | 12/1973 | (GB) . |
| 0676777 | 10/1995 | (EP) . | | 1365191 | 8/1974 | (GB) . |
| 0677915 | 10/1995 | (EP) . | | 1395152 | 5/1975 | (GB) . |
| 0684679 | 11/1995 | (EP) . | | 1424982 | 2/1976 | (GB) . |
| 0684682 | 11/1995 | (EP) . | | 1426594 | 3/1976 | (GB) . |
| 0695019 | 1/1996 | (EP) . | | 1438610 | 6/1976 | (GB) . |
| 0732787 | 9/1996 | (EP) . | | 1445284 | 8/1976 | (GB) . |
| 0738034 | 10/1996 | (EP) . | | 1479904 | 7/1977 | (GB) . |
| 0739087 A2 | 10/1996 | (EP) . | | 1493163 | 11/1977 | (GB) . |
| 0740315 | 10/1996 | (EP) . | | 1502938 | 3/1978 | (GB) . |
| 0749190 A2 | 12/1996 | (EP) . | | 1525745 | 9/1978 | (GB) . |
| 0751605 | 1/1997 | (EP) . | | 2000625 | 1/1979 | (GB) . |
| 0739087 A3 | 3/1997 | (EP) . | | 1548633 | 7/1979 | (GB) . |
| 0749193 A3 | 3/1997 | (EP) . | | 2046142 | 11/1979 | (GB) . |
| 0780926 | 6/1997 | (EP) . | | 2022327 | 12/1979 | (GB) . |
| 0802542 | 10/1997 | (EP) . | | 2025150 | 1/1980 | (GB) . |
| 0913912 A1 | 5/1999 | (EP) . | | 2034101 | 5/1980 | (GB) . |
| 805544 | 4/1936 | (FR) . | | 1574796 | 9/1980 | (GB) . |
| 841351 | 1/1938 | (FR) . | | 2070341 | 9/1981 | (GB) . |
| 847899 | 12/1938 | (FR) . | | 2070470 | 9/1981 | (GB) . |
| 916959 | 12/1946 | (FR) . | | 2071433 | 9/1981 | (GB) . |
| 1011924 | 4/1949 | (FR) . | | 2081523 | 2/1982 | (GB) . |
| 1126975 | 3/1955 | (FR) . | | 2099635 | 12/1982 | (GB) . |
| 1238795 | 7/1959 | (FR) . | | 2105925 | 3/1983 | (GB) . |
| 210817 | 5/1972 | (FR) . | | 2106306 | 4/1983 | (GB) . |
| 2251938 | 6/1975 | (FR) . | | 2106721 | 4/1983 | (GB) . |
| 2305879 | 10/1976 | (FR) . | | 2136214 | 9/1984 | (GB) . |
| 2376542 | 7/1978 | (FR) . | | 2140195 | 11/1984 | (GB) . |
| 2467502 | 4/1981 | (FR) . | | 2150153 | 6/1985 | (GB) . |
| 2481531 | 10/1981 | (FR) . | | 2268337 | 1/1994 | (GB) . |
| 2556146 | 6/1985 | (FR) . | | 2273819 | 6/1994 | (GB) . |
| 2594271 | 8/1987 | (FR) . | | 2283133 | 4/1995 | (GB) . |
| 2708157 | 1/1995 | (FR) . | | 2289992 | 12/1995 | (GB) . |
| 123906 | 3/1919 | (GB) . | | 2308490 | 6/1997 | (GB) . |
| 268271 | 3/1927 | (GB) . | | 2332557 | 6/1999 | (GB) . |
| 293861 | 11/1928 | (GB) . | | 175494 | 11/1981 | (HU) . |
| 292999 | 4/1929 | (GB) . | | 60206121 | 3/1959 | (JP) . |
| 319313 | 7/1929 | (GB) . | | 57043529 | 8/1980 | (JP) . |
| 518993 | 3/1940 | (GB) . | | 57-126117 | 5/1982 | (JP) . |
| 537609 | 6/1941 | (GB) . | | 59076156 | 10/1982 | (JP) . |
| 540456 | 10/1941 | (GB) . | | 59-159642 | 2/1983 | (JP) . |
| 589071 | 6/1947 | (GB) . | | 6264964 | 9/1985 | (JP) . |
| 666883 | 2/1952 | (GB) . | | 1129737 | 5/1989 | (JP) . |
| 685416 | 1/1953 | (GB) . | | 62320631 | 6/1989 | (JP) . |
| 702892 | 1/1954 | (GB) . | | 2017474 | 1/1990 | (JP) . |
| 715226 | 9/1954 | (GB) . | | 3245748 | 2/1990 | (JP) . |
| 723457 | 2/1955 | (GB) . | | 4179107 | 11/1990 | (JP) . |
| 739962 | 11/1955 | (GB) . | | 318253 | 1/1991 | (JP) . |
| 763761 | 12/1956 | (GB) . | | 424909 | 1/1992 | (JP) . |
| 805721 | 12/1958 | (GB) . | | 5290947 | 4/1992 | (JP) . |
| 827600 | 2/1960 | (GB) . | | 6196343 | 12/1992 | (JP) . |
| 854728 | 11/1960 | (GB) . | | 6233442 | 2/1993 | (JP) . |
| 870583 | 6/1961 | (GB) . | | 6325629 | 5/1993 | (JP) . |
| 913386 | 12/1962 | (GB) . | | 7057951 | 8/1993 | (JP) . |

| | | | | | | |
|---|---|---|---|---|---|---|
| 7264789 | 3/1994 | (JP) . | | WO9745928 | 12/1997 | (WO) . |
| 8167332 | 12/1994 | (JP) . | | WO9745929 | 12/1997 | (WO) . |
| 7161270 | 6/1995 | (JP) . | | WO9745930 | 12/1997 | (WO) . |
| 8264039 | 11/1995 | (JP) . | | WO9745931 | 12/1997 | (WO) . |
| 9200989 | 1/1996 | (JP) . | | WO9745932 | 12/1997 | (WO) . |
| 8036952 | 2/1996 | (JP) . | | WO9745933 | 12/1997 | (WO) . |
| 8167360 | 6/1996 | (JP) . | | WO9745934 | 12/1997 | (WO) . |
| 67199 | 3/1972 | (LU) . | | WO9745935 | 12/1997 | (WO) . |
| 90308 | 9/1937 | (SE) . | | WO9745936 | 12/1997 | (WO) . |
| 305899 | 11/1968 | (SE) . | | WO9745937 | 12/1997 | (WO) . |
| 255156 | 2/1969 | (SE) . | | WO9745938 | 12/1997 | (WO) . |
| 341428 | 12/1971 | (SE) . | | WO9745939 | 12/1997 | (WO) . |
| 453236 | 1/1982 | (SE) . | | WO9747067 | 12/1997 | (WO) . |
| 457792 | 6/1987 | (SE) . | | WO9834315 | of 1998 | (WO) . |
| 502417 | 12/1993 | (SE) . | | WO 98/20598 | 5/1998 | (WO) . |
| 792302 | 1/1971 | (SU) . | | WO 98/20602 | 5/1998 | (WO) . |
| 425268 | 9/1974 | (SU) . | | WO9820595 | 5/1998 | (WO) . |
| 1019553 | 1/1980 | (SU) . | | WO9820596 | 5/1998 | (WO) . |
| 694939 | 1/1982 | (SU) . | | WO9820597 | 5/1998 | (WO) . |
| 955369 | 8/1983 | (SU) . | | WO9820600 | 5/1998 | (WO) . |
| 1511810 | 5/1987 | (SU) . | | WO9821385 | 5/1998 | (WO) . |
| WO8202617 | 8/1982 | (WO) . | | PCT/FR98/ | | |
| WO8502302 | 5/1985 | (WO) . | | 00468 | 6/1998 | (WO) . |
| WO9012409 | 10/1990 | (WO) . | | WO9827634 | 6/1998 | (WO) . |
| WO9011389 * | 10/1990 | (WO) . | | WO9827635 | 6/1998 | (WO) . |
| PCT/DE90/ | | | | WO9827636 | 6/1998 | (WO) . |
| 00279 | 11/1990 | (WO) . | | WO9829927 | 7/1998 | (WO) . |
| WO9101059 | 1/1991 | (WO) . | | WO9829928 | 7/1998 | (WO) . |
| WO9101585 | 2/1991 | (WO) . | | WO9829929 | 7/1998 | (WO) . |
| WO9107807 | 3/1991 | (WO) . | | WO9829930 | 7/1998 | (WO) . |
| PCT/SE91/ | | | | WO9829931 | 7/1998 | (WO) . |
| 00077 | 4/1991 | (WO) . | | WO9829932 | 7/1998 | (WO) . |
| WO9109442 | 6/1991 | (WO) . | | WO 98/34239 | 8/1998 | (WO) . |
| WO 91/11841 | 8/1991 | (WO) . | | WO9833731 | 8/1998 | (WO) . |
| WO 91/15755 | 10/1991 | (WO) . | | WO9833736 | 8/1998 | (WO) . |
| WO8115862 | 10/1991 | (WO) . | | WO9833737 | 8/1998 | (WO) . |
| WO9201328 | 1/1992 | (WO) . | | WO9834238 | 8/1998 | (WO) . |
| WO9203870 | 3/1992 | (WO) . | | WO9834240 | 8/1998 | (WO) . |
| WO9321681 | 10/1993 | (WO) . | | WO9834241 | 8/1998 | (WO) . |
| WO9406194 | 3/1994 | (WO) . | | WO9834242 | 8/1998 | (WO) . |
| WO9518058 | 7/1995 | (WO) . | | WO9834243 | 8/1998 | (WO) . |
| WO9522153 | 8/1995 | (WO) . | | WO9834244 | 8/1998 | (WO) . |
| WO9524049 | 9/1995 | (WO) . | | WO9834245 | 8/1998 | (WO) . |
| WO9622606 | 7/1996 | (WO) . | | WO9834246 | 8/1998 | (WO) . |
| WO9622607 | 7/1996 | (WO) . | | WO9834247 | 8/1998 | (WO) . |
| PCT/CN | | | | WO9834248 | 8/1998 | (WO) . |
| 96/00010 | 10/1996 | (WO) . | | WO9834249 | 8/1998 | (WO) . |
| WO9630144 | 10/1996 | (WO) . | | WO9834250 | 8/1998 | (WO) . |
| WO9710640 | 3/1997 | (WO) . | | WO9834309 | 8/1998 | (WO) . |
| WO9711831 | 4/1997 | (WO) . | | WO9834312 | 8/1998 | (WO) . |
| WO9716881 | 5/1997 | (WO) . | | WO9834321 | 8/1998 | (WO) . |
| WO 97/29494 | 8/1997 | (WO) . | | WO9834322 | 8/1998 | (WO) . |
| WO9745288 | 12/1997 | (WO) . | | WO9834323 | 8/1998 | (WO) . |
| WO9745847 | 12/1997 | (WO) . | | WO9834325 | 8/1998 | (WO) . |
| WO9745848 | 12/1997 | (WO) . | | WO9834326 | 8/1998 | (WO) . |
| WO9745906 | 12/1997 | (WO) . | | WO9834327 | 8/1998 | (WO) . |
| WO9745907 | 12/1997 | (WO) . | | WO9834328 | 8/1998 | (WO) . |
| WO9745912 | 12/1997 | (WO) . | | WO9834329 | 8/1998 | (WO) . |
| WO9745914 | 12/1997 | (WO) . | | WO9834330 | 8/1998 | (WO) . |
| WO9745915 | 12/1997 | (WO) . | | WO9834331 | 8/1998 | (WO) . |
| WO9745916 | 12/1997 | (WO) . | | WO 98/40627 | 9/1998 | (WO) . |
| WO9745918 | 12/1997 | (WO) . | | WO 98/43336 | 10/1998 | (WO) . |
| WO9745919 | 12/1997 | (WO) . | | WO9917309 | 4/1999 | (WO) . |
| WO9745920 | 12/1997 | (WO) . | | WO9917311 | 4/1999 | (WO) . |
| WO9745921 | 12/1997 | (WO) . | | WO9917312 | 4/1999 | (WO) . |
| WO9745922 | 12/1997 | (WO) . | | WO9917313 | 4/1999 | (WO) . |
| WO9745923 | 12/1997 | (WO) . | | WO9917314 | 4/1999 | (WO) . |
| WO9745924 | 12/1997 | (WO) . | | WO9917315 | 4/1999 | (WO) . |
| WO9745925 | 12/1997 | (WO) . | | WO9917316 | 4/1999 | (WO) . |
| WO9745926 | 12/1997 | (WO) . | | WO9917422 | 4/1999 | (WO) . |
| WO9745927 | 12/1997 | (WO) . | | WO9917424 | 4/1999 | (WO) . |

| | | |
|---|---|---|
| WO9917425 | 4/1999 | (WO) . |
| WO9917426 | 4/1999 | (WO) . |
| WO9917427 | 4/1999 | (WO) . |
| WO9917428 | 4/1999 | (WO) . |
| WO9917429 | 4/1999 | (WO) . |
| WO9917432 | 4/1999 | (WO) . |
| WO9917433 | 4/1999 | (WO) . |
| WO9919963 | 4/1999 | (WO) . |
| WO9919969 | 4/1999 | (WO) . |
| WO9919970 | 4/1999 | (WO) . |
| PCT/SE98/02148 | 6/1999 | (WO) . |
| WO 99/28922 | 6/1999 | (WO) . |
| WO 99/29005 | 6/1999 | (WO) . |
| WO 99/29023 | 6/1999 | (WO) . |
| WO 99/29025 | 6/1999 | (WO) . |
| WO9927546 | 6/1999 | (WO) . |
| WO9928919 | 6/1999 | (WO) . |
| WO9928921 | 6/1999 | (WO) . |
| WO9928923 | 6/1999 | (WO) . |
| WO9928924 | 6/1999 | (WO) . |
| WO9928925 | 6/1999 | (WO) . |
| WO9928926 | 6/1999 | (WO) . |
| WO9928927 | 6/1999 | (WO) . |
| WO9928928 | 6/1999 | (WO) . |
| WO9928929 | 6/1999 | (WO) . |
| WO9928930 | 6/1999 | (WO) . |
| WO9928931 | 6/1999 | (WO) . |
| WO9928934 | 6/1999 | (WO) . |
| WO9928994 | 6/1999 | (WO) . |
| WO9929005 | 6/1999 | (WO) . |
| WO9929008 | 6/1999 | (WO) . |
| WO9929011 | 6/1999 | (WO) . |
| WO9929012 | 6/1999 | (WO) . |
| WO9929013 | 6/1999 | (WO) . |
| WO9929014 | 6/1999 | (WO) . |
| WO9929015 | 6/1999 | (WO) . |
| WO9929016 | 6/1999 | (WO) . |
| WO9929017 | 6/1999 | (WO) . |
| WO9929018 | 6/1999 | (WO) . |
| WO9929019 | 6/1999 | (WO) . |
| WO9929020 | 6/1999 | (WO) . |
| WO9929021 | 6/1999 | (WO) . |
| WO9929022 | 6/1999 | (WO) . |
| WO9929024 | 6/1999 | (WO) . |
| WO9929026 | 6/1999 | (WO) . |
| WO9929029 | 6/1999 | (WO) . |
| WO9929034 | 6/1999 | (WO) . |

OTHER PUBLICATIONS

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE Nov. 1984.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing design of water–resistant magnet wire; V. Kuzenev et al; Elektrotekhnika, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen–ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No.1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Calbe;Ichihara et al; 8/92; pp3–6.

Underground Transmission Systems Reference Book; 1992;pp16–19; pp36–45; pp67–81.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators—an assessment; A. Appleton, et al; International Conf. Proceedings, Lg HV Elec. Sys. Paris, FR, Aug.–Sep., 1976, vol. I, Section 11–02, p1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC link; I. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* ,1970, pp 6–8.

J&P Transformer Book $11^{th}$ Edition;A. C. Franklin et al; owned by Butterworth–Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. haglof et al of ASEA; ASEA Journal vol. 53, No. 1–2, 1980, pp 3–12.

Direct Connection of Generators of HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA (TEKNIK)* Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No.4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven (hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr. 1997, p 12–20.

Transforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol.12, No.3, Jul. 1997, pp. 1385–1391.

Industrial high Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551: Power Electronics;unknown author; International Electrotechnical Vocabulary Chapter 551; Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No.3, Part 2, May 1983, pp 1048–1050.

Application of high temperature superconductivy to electric motor design; J.S. Edmonds et al; IEEE Transactions on Energy Conversion Jun. 1992, No. 2 , pp 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan*, No. 63; 1977, pp 6–14.

Weatherability of Polymer–Modified Mortars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

\* cited by examiner

ANODE, PROCESS FOR ANODIZING, ANODIZED WIRE AND ELECTRIC DEVICE COMPRISING SUCH ANODIZED WIRE

BACKGROUND OF THE INVENTION

1. Field of the Invention

The invention relates to an anode for batch anodizing of a length of metallic conductor wire. More specifically, the invention relates to an anode for generating an electrically insulating oxide layer on the surface of a wire length of electric conductor wire of metal by anodizing, wherein the anode is immersed into an electrolyte. The invention also relates to a process for batch anodizing of a wire length of metallic conductor wire, in which such an anode is utilized, an insulated conductor wire with an electrically insulating surface layer by batch anodizing according to the invented anodizing process, and an electric device having one or more such insulated conductor wires which have been provided with an electrically insulating surface layer by batch anodizing.

2. Discussion of the Background

An electric device such as a cable, a transformer, a generator, a motor, etc., has at least one current carrying and voltage-carrying metallic body, hereinafter in this document referred to as a conductor. Certain high-voltage electric devices include conductors which have a large number of conductor wires of a more slender dimension, referred to in this document as strands. The strands are composed, for example laid, into parts of strands, windings or coils in generators and other electric machines. The voltage difference between the laid strands is low but the laid strands are still often insulated relative to one another.

According to the prior art, single-wire conductor wires which, as strands, are laid into coarser conductors, included in high-voltage devices, are insulated preferably by organic insulating materials, such as thermoplastic resins, waxes or varnishes. However, organic insulating materials have a poor capacity to withstand influence in severe environments. For example, they have a low temperature resistance and they must often be applied in relatively thick layers. The organic insulations also give rise to drawbacks and costs when recycling/recovering consumed or rejected conductor material since they have to be taken care of or destructed separately from the metallic conductor wire. For use in severe environments such as at high temperatures, under vacuum, in chemically aggressive environments or in environments involving a high fire hazard, it is known to use inorganic insulating materials such as insulating materials based on glass fibre or mica, which are usually wound onto the conductor wire. Further, it is known to insulate aluminum wire or aluminum-coated copper wire with a surface layer of aluminum oxide by anodic oxidation, anodizing. To obtain an oxide layer with a suitable structure and adhesion for the use described above, a treatment cycle is required which cannot be realized by way of a continuous electro-chemical process but requires a batch process. A problem in this connection is to arrange a wire of a wire length sufficient for a coil- in an electric high-voltage device. The wire length in a coil usually amounts to between a few two hundred meters and a few kilometers. The wire must in its entirety be connected to the positive pole of a current source in such a way that the potential difference is minimized over the long wire length. The wire, which preferably has a diameter of 1 to 5 mm, must usually be supported and kept in such a way that essentially the whole surface may be anodized.

SUMMARY OF THE INVENTION

It is an object of the invention to suggest an anode which has a holder suitable for anodizing, in one batch, a conductor wire with a wire length of 100 meters to 10 kilometers.

It is also an object of the invention to suggest an anodizing process for batch anodizing of a conductor wire, an anodized conductor wire manufactured by way of this process, as well as an electric device having one or more such anodized wires.

The above is achieved by way of an anode which is adapted for batch anodizing of a wire length, includes the wire to be anodized and a holder for supporting and holding the conductor wire, during the anodizing, in such a way that essentially the whole surface of the conductor wire can be anodized, whereby, according to the invention, the wire is spirally wound onto the holder and the holder has at least three guide cams with guide slots in which the spirally wound wire is fixed. Preferably, the guide slots are formed such that the contact surfaces between the holder and the wire are minimized essentially into point contacts. The guide slots of the guide cams hold the spiraled conductor wire such that all the turns are separated by a space. By this space between each turn and by the contact surfaces between holder and wire having been minimized, it is ensured that essentially the whole envelope surface of the conductor wire is anodized and that a homogeneous oxide layer is generated. The wire and the holder are immersed into an electrolyte during the anodizing, and the wire is connected at both its ends to the positive pole of a current source. The wire includes, at least in an outer layer, aluminum or copper which during the anodizing is oxidized into an oxide layer with good adhesion, a suitable structure and a thickness of less than 15 $\mu$m, preferably less than 10 $\mu$m. This ensures the workability without the oxide layer being damaged or flaked and a sufficient electrical insulation for the limited potential difference between two strands included in the same winding or coil in a high-voltage electric machine. In certain embodiments, the wire is a solid wire of some of these metals or of an alloy based on aluminum or copper, and in other embodiments a wire with a core of a first metal or alloy coated with a layer including aluminum or copper; the core may, of course, include aluminum or copper. That is to say, a core of aluminum may be coated with a copper layer, a core of copper with an aluminum layer or a core of copper or aluminum be coated with an alloy comprising copper and aluminum, respectively, where the content of the coating differs from the content of the core. Preferably, during anodizing of a batch of metal wire, a conductor wire with a wire length of 100 meters to 10 kilometers is wound onto the holder. The invention has proved to be exceedingly suitable for anodizing conductor wire with a diameter of 0.1 to 6 mm, preferably 1 to 5 mm.

The guide cams are preferably made of an electrically conducting material such as aluminum, copper or titanium. Under certain conditions, it is also suitable to connect both holder and wire ends to the positive pole of the current source.

In a preferred embodiment, the holder includes a central shaft and three bars, oriented parallel to the shaft and fixed to the central shaft by way of radially oriented arms. The bars are arranged with guide slots or with guide cams fixed to the bars.

An anode as described above is preferably suitable for use during a batch anodizing where the electrochemical, thermal or other parameters are varied during the process cycle, or during a batch anodizing which goes on for such a long time that a process where the wire is continuously drawn through the anodizing bath is not suitable.

Depending on the electrochemical conditions prevailing in the electrolytic bath, either the whole holder is made of an electrically conducting material and connected as an anode to the positive pole of the current source, or only the guide cams fixed to the bars are made of an electrically conducting material and connected as an anode to the positive pole of the current source. In the latter case, the guide cams are electrically insulated from the supporting parts of the holder. The electrolyte may contain other metal ions or anions, which during the oxidation are included in the oxide layer and act in a stabilizing way thereon or improve the adhesion to the underlying metal or in certain cases change the surface properties of the oxidized conductor wire, which surface properties facilitate water rejection, the application of polymer-based surface layers outside oxide layers, etc. The contents of such additives to the electrolyte may be controlled during the anodizing. Alternatively, other electrochemical process parameters, which influence the inclusion of such compounds in the oxide layer, may be controlled.

Through the anode and the batch anodizing, described above, it is possible to anodize conductor wires of copper or aluminum or conductor wires coated with any of these metals, such as aluminum-coated copper wires with an electrically insulating oxide layer, which exhibits an adhesion and structure such that they may be treated and formed into coils or windings in a high-voltage electric machine. The adhesion and the structure ensure that the electrical insulation may be achieved with a thin oxide layer, which makes them suitable to use as strands in coils and windings for electric high-voltage devices. It is particularly advantageous to use the anode and the anodizing process mentioned above for anodizing strands which are coordinated into an electric conductor which is wholly or partially surrounded by a polymer-based insulation and arranged to be included in a winding of a high-voltage electric machine.

A conductor wire according to the invention, as well as a high-voltage electric machine having such a conductor wire, has an improved poor capacity of resisting the influence of severe environments. For example, they have a high temperature resistance and may be applied in relatively thin layers. Nor do they give rise to any drawbacks or costs during recycling/recovery of consumed or rejected conductor material since the insulation may be taken care of and destructed together with the metallic conductor wire.

In the following, the invention will be explained in greater detail and be exemplified by means of a preferred embodiment with reference to the accompanying drawings.

Figure 2:
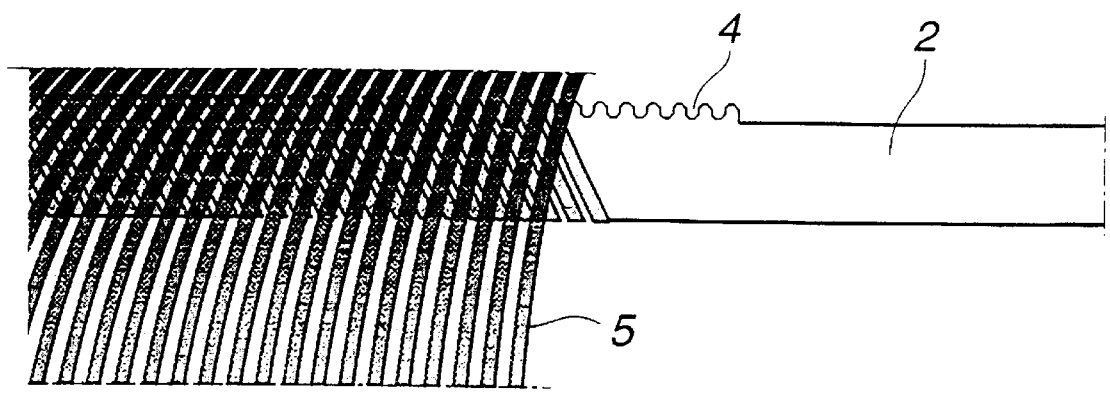

BRIEF DESCRIPTION OF THE DRAWINGS the invention will now be described in more detail in the following description of preferred embodiments, with reference to the accompanying drawings in which:

FIG. 1 is a perspective view of an anode on a holder according to the present invention; and FIG. 2 is a partial view of a cam with wire therearound according to the present invention.

DETAILED DESCRIPTION OF THE PREFERRED EMBODIMENTS

Referring now to the drawings, the anode in FIG. 1 includes a holder in the form of a central shaft 1 and three bars 2, 2a, 2b, 2c, arranged parallel to the shaft and fixed to the central shaft by way of radially oriented arms 3a, 3b, 3c. On the bars 2, 2a, 2b, 2c, guide cams 4, 4a, 4b, 4c are fixed. The guide cams 4, 4a, 4b, 4c are made of aluminum and are shown in more detail in FIG. 2. The guide cams 4, 4a, 4b, 4c may be electrically insulated from the supporting parts 2, 2a, 2b, 2c, 3a, 3b, 3c of the holder. The wire 5 which is to be anodized is spirally wound onto the holder and each turn is fixed in the guide slots of the guide cams 4a, 4b, 4c. At both ends the wire 5 is electrically connected to the positive pole of a current source (not shown). During anodizing, the whole holder with the wound-on wire 5 is immersed into an electrolyte, an electrolytic bath. In the electrolytic bath, the electrochemical, thermal or other parameters are controlled during the process cycle. In certain cases, the process cycle during the batch anodizing takes such a long time that, even if the process parameters are kept essentially constant during the whole anodizing, a process where the wire is continuously drawn through the anodizing bath is not suitable. Depending on the electrochemical conditions prevailing in the electrolytic bath, either the whole holder is made of an electrically conducting material and connected as an anode to the positive pole of the current source, or only the guide cams 4a, 4b, 4c, fixed to the bars, are made of an electrically conducting material and connected as an anode to the positive pole of the current source. In the latter case, the guide cams 4a, 4b, 4c are electrically insulated from the supporting parts of the holder. The electrolyte may contain other metal ions or anions, which, during the oxidation, are included in the oxide layer and act in a stabilizing manner thereon, or improve the adhesion to the underlying metal or, in certain cases, change the surface properties of the oxidized conductor wire, which properties facilitate water rejection, the application of polymer-based surface layers outside oxide layers, etc. The contents of such additives to the electrolyte may be controlled during the anodizing. Alternatively, other electrochemical process parameters, which influence the inclusion of such compounds in the oxide layer, may be controlled. By way of an anode according to FIGS. 1 and 2, the batch anodizing may be carried out and a thin oxide layer, less than 10 $\mu$m, with good adhesion to the underlying metal and a suitable structure be generated on conductor wires of copper or aluminum or conductor wires coated with any of these metals such as a aluminum-coated copper wires with an electrically insulating oxide layer. Since the oxide layer exhibits a good adhesion and a suitable structure, the conductor wires may be treated and formed into coils or windings in a high-voltage machine without the electrical insulating capacity being reduced by cracks or flaking. This fact, and the small thickness of the oxide layer, contribute to the conductor wires according to the present invention being very suitable to use as strands in coils and windings for electric high-voltage devices. It is especially advantageous to use the anode and the anodizing process, described in the foregoing, for anodizing strands which are coordinated into an electric conductor which is wholly or partially surrounded by a polymer-based insulation and is adapted to form part of a winding of a high-voltage electric machine. A conductor wire according to the invention, as well as a high-voltage electric machine with such a conductor wire, have an improved ability to resist the influence of severe environments. For example, they have a high temperature resistance and may be applied in relatively thin layers. Nor does this give rise to any drawbacks or costs during recycling/recovery of consumed or rejected conductor material since the insulation may be taken care of and be destructed together with the metallic conductor wire.

What is claimed is:

1. A batch anodization device for anodizing a metallic conductor wire having a predetermined length, comprising:

a holder configured to support and hold the metallic conductor wire at contact points in a predetermined position during an anodizing operation, said holder including at least three cam guides each having guide slots, said metallic conductor wire being spirally wound in the guide slots so as to be fixedly held, a separation space between respective of the guide slots in each turn being a predetermined distance, said holder with said metallic conductor wire configured to be immersed in an electrolyte during said anodizing operation; and a current source having a positive pole, respective ends of said metallic conductor wire connected to the positive pole of the current source during said anodizing operation, wherein said holder including a central shaft and three bars arranged parallel to the central shaft and fixed to the central shaft by radially oriented arms.

2. The anode of claim 1, wherein:

the at least three guide cams being made of an electrically conducting material.

3. The anode of claim 2, wherein:

respective of the at least three guide cams being connected to the positive pole of the current source.

4. The anode of claim 1, wherein:

said metallic conductor wire comprising aluminum.

5. The anode of claim 1, wherein:

said metallic conductor wire including copper.

6. A method for anodizing a metallic conductor wire having a predetermined wire length, comprising steps of:

spirally winding said metallic conductor wire onto a holder having at least three guide cams with guide slots, including spirally winding the metallic conductor wire on the holder to form turns that are fixed held at contact points by the guide slots such that the turns of the metallic conductor wire being spaced apart by a predetermined distance, said holder having a central shaft and bars arranged in parallel to the central shaft, the bars being connected to the central shaft by radially oriented arms;

connecting both ends of said metallic conductor wire to a positive pole of a current source; and immersing said metallic conductor wire on said holder into an electrolyte.

7. The method of claim 6, further comprising:

varying at least one process parameter during the anodizing operation for generating an oxide layer that fixedly adheres to an underlying metal portion of said metallic conductor wire, said oxide layer having a thickness less than 15 µm.

8. The process of claim 7, wherein:

said varying step includes controlling an electrochemical process parameter according to a predetermined cycle during the anodizing operation.

9. The process of claim 7, wherein:

said varying step includes varying a temperature during the anodizing operation.

10. An anodized conductor wire comprising:

a metallic conductor wire having a predetermined length;

an oxide layer disposed on said metallic conductor wire by batch anodizing of the metallic conductor wire, said oxide layer being thin and exhibiting a structure and adhesion to an underlying metal portion of said metallic conductor wire so as to be configured for continued adhesion to the underlying metal portion when said metallic conductor wire being shaped for use in at least one of a coil and a winding of a high-voltage electric machine;

said oxide layer having an electrically insulating property configured to electrically insulate respective strands of a winding in the high-voltage electric machine, wherein said oxide layer being formed by batch anodizing when said metallic conductor wire being wound on a holder having at least three cam guides with guide slots, a central shaft and bars arranged in parallel to the central shaft and fixed to the central shaft by radially oriented arms, contact surfaces between said holder and said metallic conductor wire being contact points, said guide slots separating respective turns of said metallic conductor wire when spirally wound and immersed into an electrolyte and when both ends of said metallic conductor wire being connected to a positive pole of a current source.

11. The anodized conductor wire of claim 10, wherein:

said oxide layer being less than 15 µm.

12. The anodized conductor wire of claim 10, wherein:

said metallic conductor wire comprising aluminum.

13. The anodized conductor wire of claim 10, wherein:

said metallic conduct wire comprising copper.

* * * * *